United States Patent [19]

Ishitoya et al.

[11] Patent Number: 5,401,556
[45] Date of Patent: Mar. 28, 1995

[54] LAMINATED WOOD-BASED FIBROUS WEB AND MOLDED ARTICLE FORMED OF SUCH WEB AND PROCESS FOR MANUFACTURING ARTICLE

[75] Inventors: Katsunori Ishitoya; Yukio Ishihara; Takahisa Suzuki, all of Toyota, Japan

[73] Assignee: Arako Kabushiki Kaisha, Japan

[21] Appl. No.: 226,751

[22] Filed: Apr. 12, 1994

[30] Foreign Application Priority Data

| Apr. 13, 1993 | [JP] | Japan | 5-086200 |
| Oct. 8, 1993 | [JP] | Japan | 5-253131 |
| Dec. 24, 1993 | [JP] | Japan | 5-328204 |

[51] Int. Cl.⁶ ............................................. B32B 5/12
[52] U.S. Cl. ................................. 428/109; 156/148; 156/196; 156/221; 156/242; 156/245; 156/307.3; 156/307.7; 264/258; 428/233; 428/234; 428/247; 428/248; 428/255; 428/300

[58] Field of Search ............... 428/109, 110, 247, 234, 428/255, 248, 233, 300; 156/196, 245, 242, 221, 307.3, 307.7; 264/258

[56] References Cited

U.S. PATENT DOCUMENTS 4,865,788 9/1989 Davis .................................. 264/112

Primary Examiner—James J. Bell
Attorney, Agent, or Firm—Palmatier, Sjoquist & Helget

[57] ABSTRACT

A molded article includes a laminated wood-based fibrous web molded into a desired shape by a compression molding operation. The laminated wood-based fibrous web includes a wood-based fibrous web base and a synthetic fiber scrim laminated to the web base, the web base being formed of a fiber composition mainly constituted of wood pulp, synthetic fibers and binder, the scrim being impregnated with a synthetic resin.

10 Claims, 7 Drawing Sheets

LAMINATED WOOD-BASED FIBROUS WEB AND MOLDED ARTICLE FORMED OF SUCH WEB AND PROCESS FOR MANUFACTURING ARTICLE

BACKGROUND OF THE INVENTION

The present invention relates to a laminated wood-based fibrous web in which a wood-based fibrous web base is laminated with scrim. The present invention also relates to a molded article formed of such a laminated web and a process for manufacturing the molded article.

FIGS. 8, 9, 10a and 10b show one example of a conventional wood-based fibrous web 102 for a door trim board 101 as a molded article. The fibrous web 102 is formed of a fiber composition prepared by mixing wood pulp (fibers or fiber bundles produced by mechanically grinding a log of wood or chemically processing wood chips) and synthetic fibers such as polyester fibers and by adding a binder such as phenolic resin to this mixture. The wood-based fibrous web 102 is molded into the door trim board 101 by a compression molding operation. In the compression molding operation, the fibrous web 102 is arranged in a mold cavity formed between a pair of compression molding dies 121a and 121b and is molded into a desired configuration at the temperature of about 220° C., as shown in FIG. 10a.

In the wood-based fibrous web 102 thus formed, the intertwining power established between the wood fibers and the synthetic fibers is so small that it lacks extensibility for easy flexing. Consequently, as shown in FIGS. 9, 10a and 10b, the fiber density of the wood-based fibrous web 102 may be extremely reduced at an edge portion 105, a sharply curved portion 106 and other portions when it is compression molded into the door trim board 101. This may produces "lack of hiding 107 (slightly magnified for illustrative purposes)" and "cracks (not shown)" on the formed door trim board 101 at such portions.

Further, the wood-based fibrous web 102 thus formed may easily release the wood fibers therefrom. The released wood fibers tend to adhere to the surface of the mold cavity of the compression molding die 121 during compression molding procedure. This may require much working time for maintenance of the die 121.

U.S. Pat. No. 4,865,788, issued to Davis, on Sep. 12, 1989, discloses a laminated wood-based fibrous web which may effectively inhibit formation of "lack of hiding" and "cracks".

As shown in FIG. 11, the laminated web 204 of this patent is constituted of a wood-based fibrous web base 202 and scrim 203 laminated on the surface (lower surface) of the fibrous web base 202. The wood-based fibrous web base 202 is formed of a fiber composition prepared by mixing wood pulp and synthetic fibers and by adding a binder resin to this mixture as is practiced in the prior art. The scrim 203 is made of a thin sheet of non-woven synthetic fabric. The fibrous web base 202 is finally mechanically bound or locked to the scrim 203 by needling operation using a needling machine having numerous needles 217. As will be appreciated, the needling operation may intertwine the fibers of the web base 202 and the scrim 203 to interlock between the fibrous web base 202 and the scrim 203.

The laminated web 204 thus formed exhibits a superior extensibility during the compression molding operation for forming a molded article such as a door trim board 201. However, the needling operation applied to such a web 204 considerably damages the scrim 203 to loosen the fibers thereof. Such loose fibers may easily raise from the surface of the scrim 203 to form irregular "fluff" 203a on the scrim 203 when the door trim board 201 is finished by abrasive paper to smooth the surface thereof. This may lead undesirable awkward appearance of the door trim board 201.

SUMMARY OF THE INVENTION

It is an object of the invention to provide a laminated wood-based fibrous web which has superior extensibility and which may produce a molded article such as a door trim board exhibiting good appearance.

It is another object of the invention to provide a molded article which may exhibit good appearance and to provide a method for easily producing such an article.

The present invention provides a laminated wood-based fibrous web comprising a wood-based fibrous web base and a synthetic fiber scrim laminated to the web base, the web base being formed of a fiber composition mainly constituted of wood pulp, synthetic fibers and binder, the scrim being impregnated with a synthetic resin.

The present invention also provides a molded article comprising a laminated wood-based fibrous web molded into a desired shape by a compression molding operation, the laminated wood-based fibrous web including a wood-based fibrous web base and a synthetic fiber scrim laminated to the web base, the web base being formed of a fiber composition mainly constituted of wood pulp, synthetic fibers and binder, the scrim being impregnated with a synthetic resin.

The present invention further provides a method of manufacturing a molded article comprising the steps of laminating a synthetic fiber scrim to a wood-based fibrous web base for producing a laminated wood-based fibrous web, the wood-based fibrous web base being formed of a fiber composition mainly constituted of wood pulp, synthetic fibers and binder, the scrim being impregnated with a synthetic resin; and molding the laminated wood-based fibrous web into a desired shape by a compression molding operation, the synthetic resin being permeated into the wood-based fibrous web base during the compression molding operation, thereby to fixedly bond the scrim to the wood-based fibrous web base.

The laminated wood-based fibrous web of the present invention includes the scrim impregnated with the synthetic resin and applied to the surface of the fibrous web base. This may effectively enhance extensibility of the laminated wood-based fibrous web.

The molded article of the present invention has a sufficiently smoothed surface having extremely increased wear resistance. This may remarkably facilitate the finishing operation to smooth the surface of the molded article and may prevent formation of "fluff" on the scrim during the finishing operation by abrasive paper. Further, the molded article has increased durability and flexture strength since the fibers of the scrim are effectively interlocked to the fibers of the fibrous web base by the synthetic resin.

In the method of the present invention, the surface of the molded article is effectively smoothed during the compression molding operation. Furthermore, the scrim is fixedly bonded to the fibrous web base during the compression molding operation. This may easily provide the molded article having a highly smoothed and sufficient wear resistant surface and having increased durability.

The present invention will become more fully apparent from the claims and the description as it proceeds in connection with the drawings.

BRIEF DESCRIPTION OF THE DRAWINGS

FIG. 10b is an enlarged view of the encircled portion of FIG. 10a;

DETAILED DESCRIPTION OF THE PREFERRED EMBODIMENT

A preferred embodiment of the present invention will now be described with reference to FIGS. 1 to 7.

Figure 4:
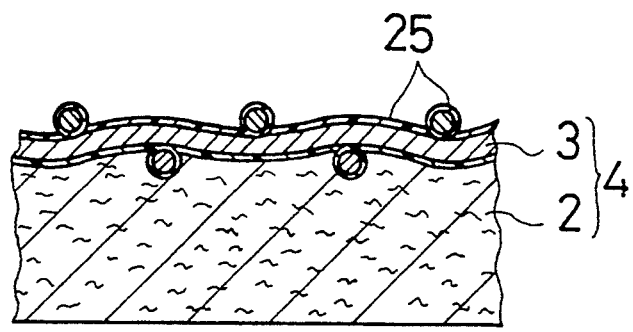
FIG. 4 is a sectional view taken along line IV—IV of FIG. 1.

As shown in FIG. 4, a laminated wood-based fibrous web 4 of the present invention is constituted of a wood-based fibrous web base 2 and a synthetic fiber scrim 3 applied on the fibrous web base 2. The fibrous web base 2 is formed of a fiber composition prepared by mixing wood pulp (fibers or fiber bundles produced by mechanically grinding a log of wood or chemically processing wood chips) and synthetic fibers such as polyester fibers and by adding a binder such as phenolic resin to this mixture. The scrim 3 is made of a woven rayon or regenerated cellulose fabric. An example of the woven fabric is formed by weaving the rayon fiber yarns having a cotton yarn number (British) in the range of 20-30. The woven fabric preferably includes 12 to 20 wrap yarns and 12 to 20 weft yarns per square inch. The scrim 3 is also impregnated with a synthetic resin 25. The synthetic resin 25 useful in the present invention includes a water permeable resin which cures to exhibit superior wear resistance, for example, polyvinyl alcohol (PVA).

Figure 1:
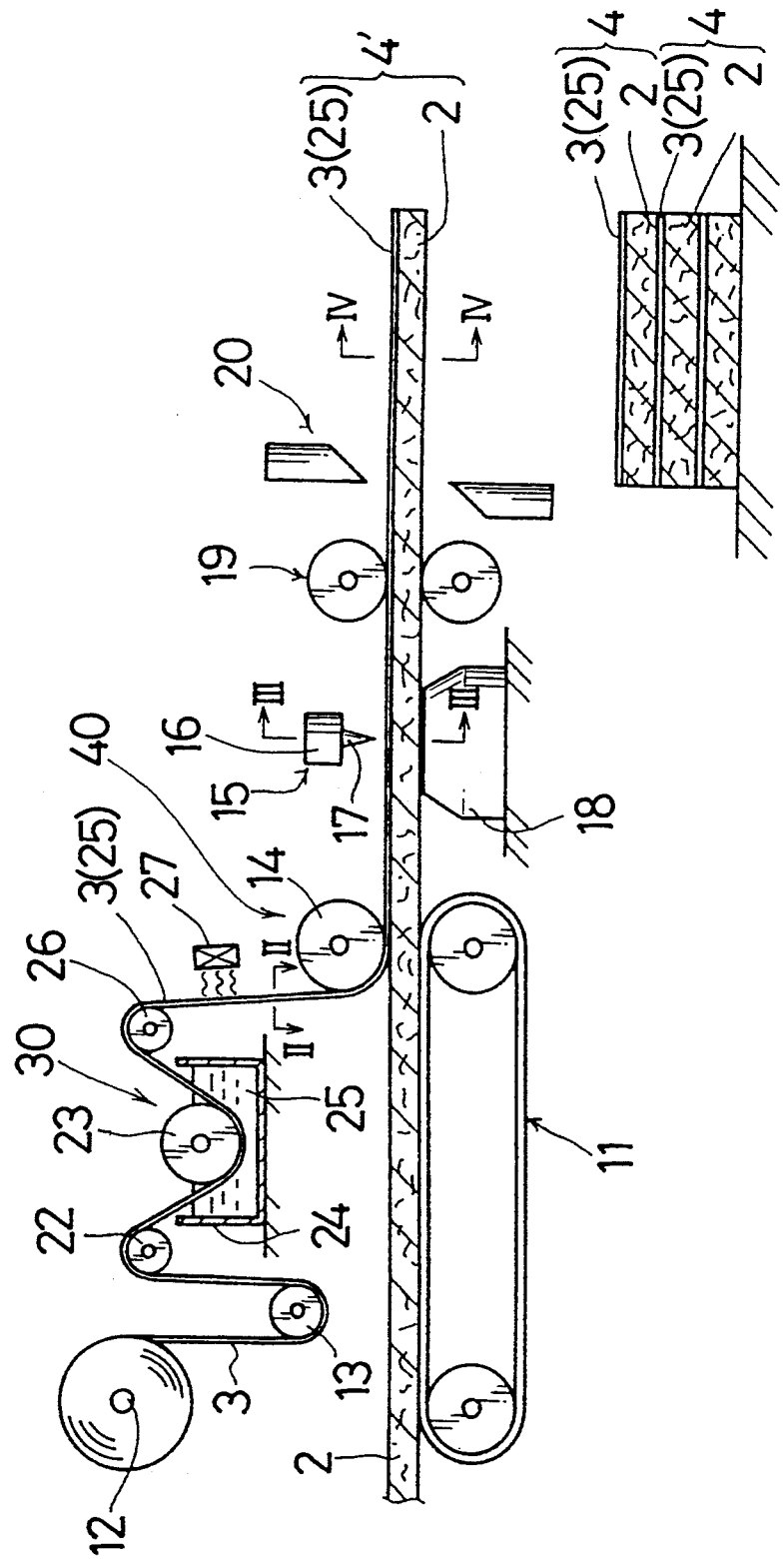
FIG. 1 is a schematic view showing a manufacturing equipment for use in the present invention.
Figure 2:
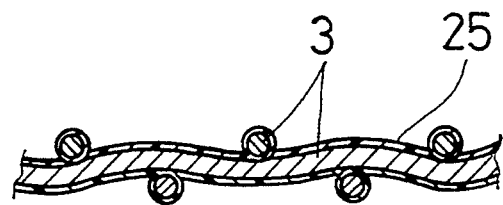
FIG. 2 is a sectional view taken along line II—II of FIG. 1.

Referring to FIG. 1, shown therein is manufacturing apparatus for manufacturing the laminated wood-based fibrous web 4.

The wood-based fibrous web base 2 is forwardly conveyed toward a lamination station 40 by a conveyor 11 which may controlled to intermittently move. On the other hand, the scrim 3 uncoiled from a coil 12 passes around idler rolls 13 and 22 before entering a dipping station designated by the reference numeral 30 where the molten synthetic resin 25 is impregnated to the scrim 3. It is to be noted that the scrim 3 is controlled to be uncoiled in synchronism with the conveyor 11. The dipping station 30 includes an applicator roll 23 around which the scrim 3 is forwardly transferred. The applicator roll 23 is positioned to rotate within a dipping pan 24 and is partially immersed in the molten synthetic resin 25 reserved in the dipping pan 24 for impregnation of the resin 25 to the scrim 3. Subsequent to the dipping station, the scrim 3 impregnated with the synthetic resin 25 passes around an idler roll 26 prior to entering a drying unit 27 such as an electric heater and an infrared heater where the synthetic resin 25 is forced to be dried up. After passing through the drying unit 27, the scrim 3 continues to move toward the lamination station 40 where it is laminated to the fibrous web base 2. The lamination station 40 includes an applicator roll 14 for lamination of the scrim 3. The scrim 3 from the drying unit 27 passes around the applicator roll 14 by which the scrim 3 is laminated to the upper surface of the fibrous web base 2 to form a continuous laminated wood-based fibrous web 4'.

Figure 3:
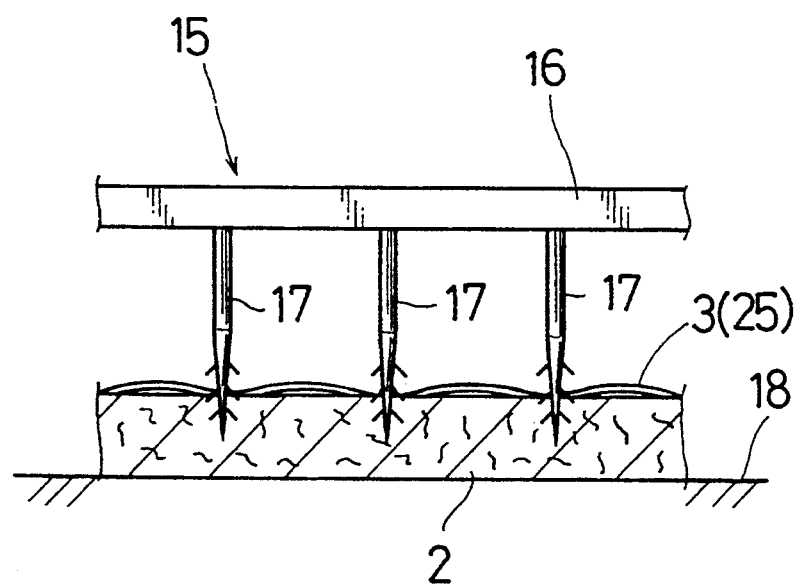
FIG. 3 is a sectional view taken along line III—III of FIG. 1.

The continuous laminated wood-based fibrous web 4' thus formed is conducted to a needling machine 15 where it is processed by needling, as shown in FIG. 3. The needling machine 15 includes a reciprocable needle holder 16 having numerous needles 17 and a base 18 positioned beneath the needle holder 16. The needle holder 16 is controlled to reciprocate in synchronism with the conveyor 11 so that the needling operation to the continuous laminated web 4' is accomplished when the conveyor 11 is stopped.

The needling operation strongly intertwines the fibers of the web base 2 and the scrim 3 to form the continuous laminated wood-based fibrous web 4' in which the scrim 3 is combined to the fibrous web base 2, as shown in FIG. 4.

After passing under the needling machine 15, the continuous laminated fibrous web 4' continues to pass between a pair of drive roll 19 driven in synchronism with the conveyor 11 before entering a cutting machine 20 where it is severed to form the laminated web 4 having a desired length.

The laminated web 4 thus formed has superior extensibility and high tensile strength- and is suited for compression molding to produce a molded article such as a door trim board.

Explained hereinafter is the process for manufacturing a door trim board 1 as a molded article in connection with the operation of a compression molding machine.

Figure 5:
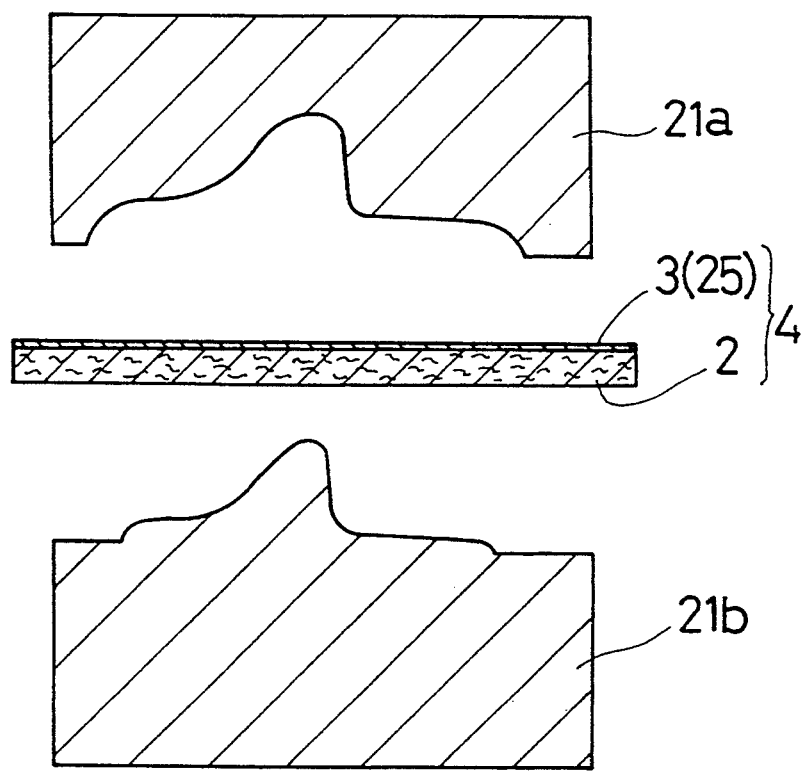
FIG. 5 is a fragmentary sectional view of the laminated wood-based fibrous web before entering a compression molding operation.

The compression molding machine includes a pair of compression molding dies 21a and 21b (FIG. 5). The molding dies 21a and 21b, when mated with each other, may form a molding cavity therebetween which is configured to conform to the configuration of the door trim board 1.

As shown in FIG. 5, the laminated web 4 is arranged between the compression molding dies 21a and 21b.

Figure 6:
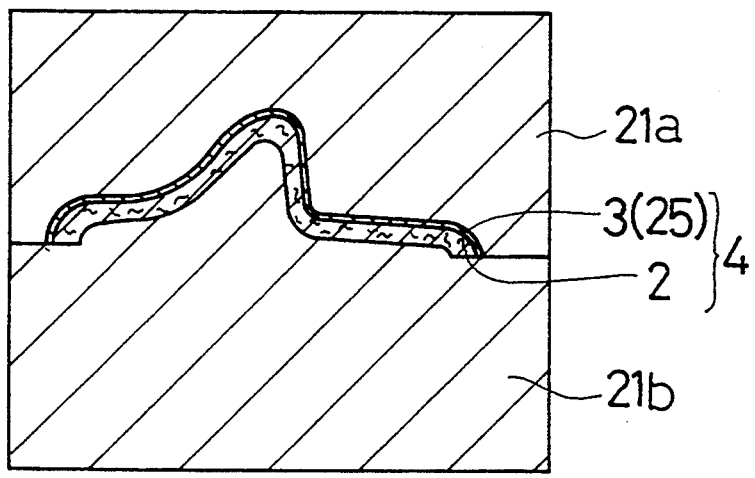
FIG. 6 is a fragmentary sectional view of the laminated wood-based fibrous web during the compression molding operation.
Figure 7:
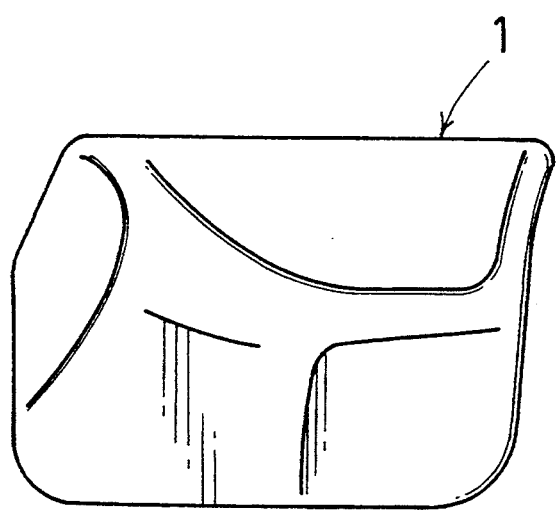
FIG. 7 is a plan view of a door trim board formed of the laminated wood-based fibrous web.
Figure 8:
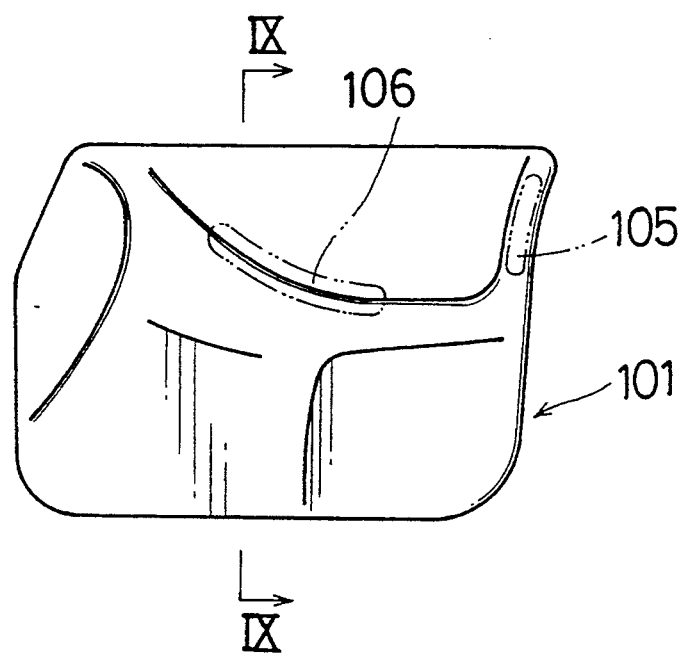
FIG. 8 is a plan view of a door trim board formed of a conventional wood-based fibrous web.
Figure 9:
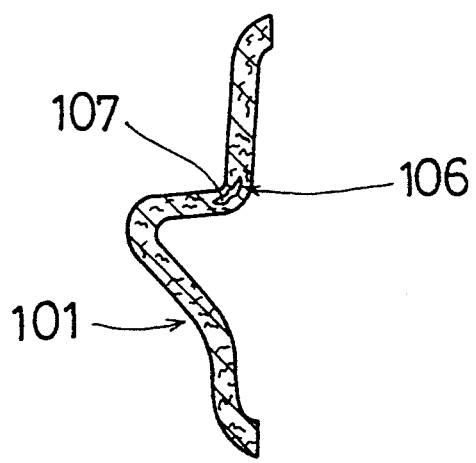
FIG. 9 is a sectional view taken along line IX—IX of FIG. 8.
Figure 10A:
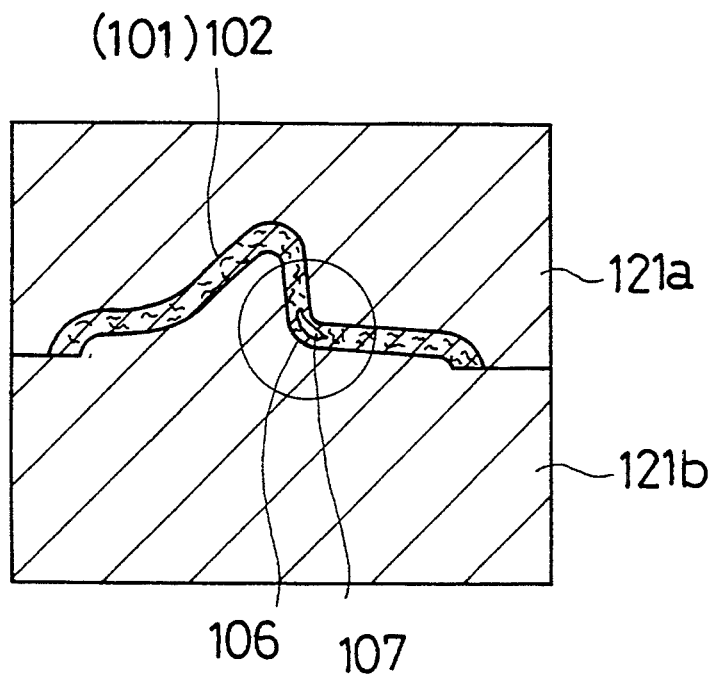
FIG. 10a is a fragmentary sectional view of the conventional wood-based fibrous web during the compression molding operation.
Figure 10B:
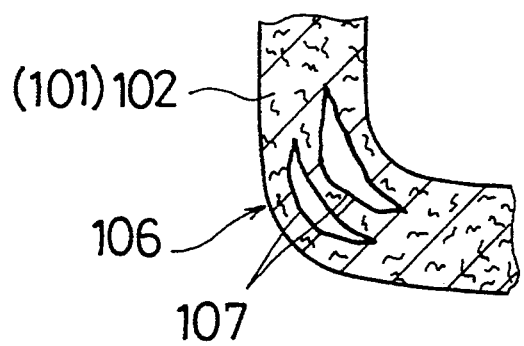
Figure 11:
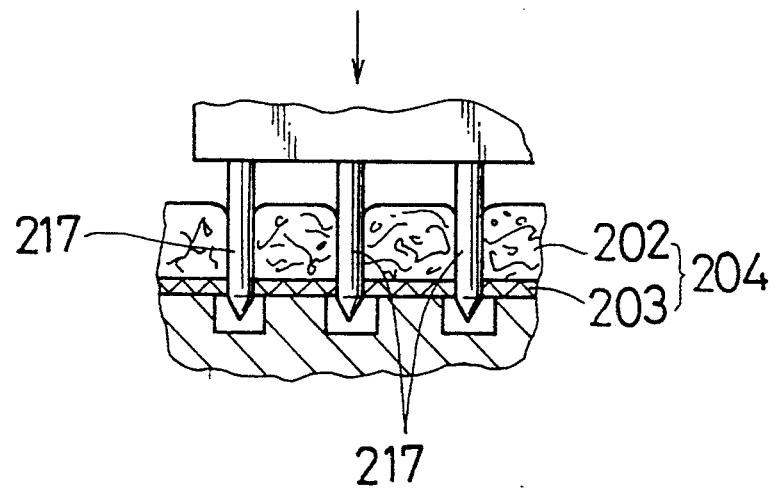
FIG. 11 is an enlarged fragmentary sectional view of a conventional laminated wood-based fibrous web, showing a needling operation.
Figure 12:
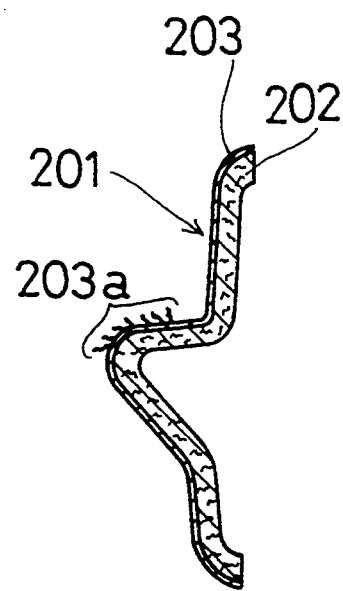
FIG. 12 is a sectional view of a door trim board formed of the conventional laminated wood-based fibrous web of which the surface is finished by abrasive paper.

Subsequently, as shown in FIG. 6, the compression molding dies 21a and 21b are mated or closed and are heated to the temperature of about 220° C. so that the laminated web 4 is compression molded to form the door trim board 1 (FIG. 7).

The door trim board i thus formed has no "lack of hiding" and "cracks" thereon since the laminated web 4 has superior extensibility to flex around the sharply curved portions within the molding cavity.

The synthetic resin 25 impregnated to the scrim 3 is activated with the aid of water contained in the wood-based fibrous web base 2 to effectively interlock the fibers of the fibrous web base 2 and the scrim 3 during the compression molding operation. Consequently, the scrim 3 is fixedly bonded to the fibrous web base 2 so as to increase durability of the door trim board 1.

Furthermore, the synthetic resin 25 impregnated to the scrim 3 is melted and cured again in the molding cavity during the compression molding operation so that the scrim 3 damaged by needling is sufficiently restored to form a surface sufficiently smoothed and having acceptable wear resistance. This may remarkably facilitate the finishing operation to smooth the door trim board 1. This may also effectively prevent easy raising of the fibers of the scrim 3 when the door trim board i is finished by abrasive paper.

Upon finishing of the compression molding operation, the synthetic resin 25 in the scrim 3 is permeated into the fibers of the fibrous web base 2 to further enhance the bonding power between the fibrous web base 2 and the scrim 3. This may significantly increase flexture strength of the door trim board 1.

The preferred embodiment herein described can be modified, if desired.

Although, in the preferred embodiment as described above, the synthetic resin 25 impregnated to the scrim 3 is forced to dry in the drying unit 27 before entering the lamination station 40, the drying unit 27 may be omitted so that the synthetic resin 25 is dried after lamination of the scrim 3 to the fibrous web base 2 at the lamination station 40. In such a case, the synthetic resin 25 will be cured with the scrim 3 contacted to the fibrous web base 2 for effectively combining the scrim 3 with the fibrous web base 2. This may necessarily eliminate the requirement of the needling operation.

The scrim 3 may be impregnated with the synthetic resin 25 by a sprayer.

Further, the scrim 3 may be made of a non-woven fabric of rayon yarns.

Although, in the preferred embodiment as described above, the laminated web 4 is heated by heating the molding die 21a and 21b during the compression molding operation, the laminated web 4 may be directly heated by directly applying thereto with high frequency voltage, ultrasonic wave and the like.

The laminated web 4 may be moldable into a luggage trim board, a package trim board or the like.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A laminated wood-based fibrous web comprising a wood-based fibrous web base and a synthetic fiber scrim laminated to said web base, said web base being formed, prior to said laminating, of a fiber composition mainly constituted of wood pulp, synthetic fibers and binder, said scrim being impregnated, prior to said laminating, with a synthetic resin.

2. The laminated wood-based fibrous web as defined in claim 1, wherein said scrim is made of a woven rayon fabric.

3. The laminated wood-based fibrous web as defined in claim 1, wherein said scrim is made of a non-woven rayon fabric.

4. A molded article comprising a laminated wood-based fibrous web molded into a desired shape by a compression molding operation, said laminated wood-based fibrous web including a wood-based fibrous web base and a synthetic fiber scrim laminated to said web base, said web base being formed of a fiber composition mainly constituted of wood pulp, synthetic fibers and binder, said scrim being impregnated with a synthetic resin prior to the compression molding operation and prior to being laminated to said web base.

5. The molded article as defined in claim 4, wherein said synthetic resin is permeated into said wood-based fibrous web base during the compression molding operation, thereby to fixedly bond said scrim to said wood-based fibrous web base.

6. The molded article as defined in claim 5, wherein said scrim is made of a woven rayon fabric.

7. The molded article as defined in claim 5, wherein said scrim is made of a non-woven rayon fabric.

8. A method of manufacturing a molded article comprising the steps of:
impregnating a synthetic fiber scrim with a synthetic resin;
laminating said synthetic fiber scrim to a wood-based fibrous web base for producing a laminated wood-based fibrous web, said wood-based fibrous web base being formed of a fiber composition mainly constituted of wood pulp, synthetic fibers and binder, and
molding said laminated wood-based fibrous web and scrim into a desired shape by a compression molding operation, said synthetic resin being permeated into said wood-based fibrous web base during the compression molding operation, thereby to fixedly bond said scrim to said wood-based fibrous web base.

9. The method as defined in claim 8 further comprising the steps of drying said synthetic resin before lamination of said synthetic fiber scrim to said wood-based fibrous web base, and needling said laminated wood-based fibrous web and scrim before said compression molding operation.

10. The method as defined in claim 8, wherein said synthetic resin is dried after lamination of said scrim to said wood-based fibrous web base.

* * * * *

UNITED STATES PATENT AND TRADEMARK OFFICE
CERTIFICATE OF CORRECTION

PATENT NO. : 5,401,556
DATED : March 28, 1995
INVENTOR(S) : Katsunori Ishitoya et al It is certified that error appears in the above-indentified patent and that said Letters Patent is hereby corrected as shown below:

Column 5, line 6, "trim board i" should be -- trim board 1 --.

Column 5, line 26, "trim board i" should be -- trim board 1 --.

Signed and Sealed this

Eighteenth Day of July, 1995

Attest:

BRUCE LEHMAN

*Attesting Officer*      *Commissioner of Patents and Trademarks*